(12) United States Patent
Isono et al.

(10) Patent No.: US 10,384,535 B2
(45) Date of Patent: Aug. 20, 2019

(54) DRIVE UNIT

(71) Applicants: TOYOTA JIDOSHA KABUSHIKI KAISHA, Toyota-shi, Aichi (JP); ALCHEMICA CORPORATION, Susono-shi, Shizuoka (JP)

(72) Inventors: Hiroshi Isono, Susono (JP); Nobuyoshi Sugitani, Susono (JP); Aizoh Kubo, Kyoto (JP)

(73) Assignees: TOYOTA JIDOSHA KABUSHIKI KAISHA, Toyota (JP); ALCHEMICA CORPORATION, Susono-shi (JP)

( * ) Notice: Subject to any disclaimer, the term of this patent is extended or adjusted under 35 U.S.C. 154(b) by 103 days.

(21) Appl. No.: 15/581,082

(22) Filed: Apr. 28, 2017

(65) Prior Publication Data

US 2017/0313181 A1    Nov. 2, 2017

(30) Foreign Application Priority Data

Apr. 28, 2016  (JP) ................ 2016-091683

(51) Int. Cl.
*B60K 1/02* (2006.01)
*B60K 17/04* (2006.01)
(Continued)

(52) U.S. Cl.
CPC .............. *B60K 17/046* (2013.01); *B60K 1/02* (2013.01); *B60K 7/0007* (2013.01); *B60K 17/02* (2013.01); *B60K 17/145* (2013.01); *F16D 55/2262* (2013.01); *F16D 65/18* (2013.01); *F16D 65/186* (2013.01); *F16H 1/28* (2013.01); *B60K 2007/0038* (2013.01);
(Continued)

(58) Field of Classification Search
CPC ........ B60K 1/02; B60K 7/0007; B60K 17/02; B60K 17/046; B60K 17/145; B60K 2007/0038; B60K 2007/0061; B60K 2007/0092; F16D 55/2262; F16D 65/18; F16D 65/186; F16D 2121/20; F16H 1/28; B60Y 2400/424; B60Y 2400/73
USPC ..................................... 475/5, 149
See application file for complete search history.

(56) References Cited

U.S. PATENT DOCUMENTS 5,419,406 A * 5/1995 Kawamoto ............... B60K 1/02
                                              180/65.6
6,340,077 B1 * 1/2002 Schaffer ................ B60T 13/741
                                              188/156

(Continued)

FOREIGN PATENT DOCUMENTS

JP    H05-169991 A    7/1993
JP    2002-112410 A    4/2002
(Continued)

*Primary Examiner* — Leslie A Nicholson, III
(74) *Attorney, Agent, or Firm* — Oliff PLC

(57) ABSTRACT

A drive unit having a downsized brake device for applying a braking force to a drive wheel is provided. The drive unit comprises: a first brake device that applies braking torque to a first rotary member situated closer to a first motor than a first speed reducing device in a first torque transmitting route between the first motor and a first drive shaft; and a second brake device that applies braking torque to a second rotary member situated closer to a second motor than a second speed reducing device in a second torque transmitting route between the second motor and a second drive shaft.

5 Claims, 5 Drawing Sheets

(51) Int. Cl.
*F16D 65/18* (2006.01)
*F16H 1/28* (2006.01)
*B60K 7/00* (2006.01)
*B60K 17/02* (2006.01)
*B60K 17/14* (2006.01)
*F16D 55/226* (2006.01)
*F16D 121/20* (2012.01)

(52) U.S. Cl.
CPC .................. *B60K 2007/0061* (2013.01); *B60K 2007/0092* (2013.01); *B60Y 2400/424* (2013.01); *B60Y 2400/73* (2013.01); *F16D 2121/20* (2013.01)

(56) References Cited

U.S. PATENT DOCUMENTS

| | | | | |
|---|---|---|---|---|
| 7,326,141 | B2* | 2/2008 | Lyons | B60K 7/0007 180/6.2 |
| 8,029,399 | B2* | 10/2011 | Thompson | B62D 11/16 180/6.44 |
| 8,303,446 | B2* | 11/2012 | Thompson | F16H 35/008 475/5 |
| 9,494,218 | B2* | 11/2016 | Honda | B60K 6/365 |
| 2009/0133944 | A1* | 5/2009 | Nishioka | B60G 3/20 180/65.51 |
| 2009/0152071 | A1 | 6/2009 | Jeon | |
| 2012/0143426 | A1* | 6/2012 | Yamamoto | B60K 6/448 701/22 |
| 2013/0059694 | A1* | 3/2013 | Ooiso | B60K 1/02 475/269 |
| 2013/0165293 | A1* | 6/2013 | Shinohara | B60K 1/02 477/3 |
| 2013/0186717 | A1 | 7/2013 | Muramatsu et al. | |
| 2016/0153537 | A1 | 6/2016 | Kubo et al. | |
| 2017/0182884 | A1* | 6/2017 | Jeong | B60L 15/2054 |
| 2017/0241532 | A1* | 8/2017 | Isono | F16H 48/36 |
| 2017/0349038 | A1* | 12/2017 | Shinohara | B60K 1/02 |

FOREIGN PATENT DOCUMENTS

| | | |
|---|---|---|
| JP | 2009-136078 A | 6/2009 |
| JP | 2009-144908 A | 7/2009 |
| JP | 2011-190918 A | 9/2011 |
| JP | 2012-087889 A | 5/2012 |
| WO | 2015/008661 A1 | 1/2015 |

* cited by examiner

DRIVE UNIT

CROSS REFERENCE TO RELATED APPLICATION

The present invention claims the benefit of Japanese Patent Application No. 2016-091683 filed on Apr. 28, 2016 with the Japanese Patent Office, the disclosures of which are incorporated herein by reference in its entirety.

BACKGROUND

Field of the Invention

Embodiments of the present application relate to the art of a drive unit for differentiating torques of driveshafts connected to right and left drive wheels.

Discussion of the Related Art

PCT international publication WO 2015/008661 describes one example of a torque vectoring device of this kind. The drive gear unit taught by WO 2015/008661 as a torque vectoring device comprises a differential unit for distributing torque delivered from a drive motor to right and left drive wheels, and a differential motor for controlling a torque split ratio to the drive wheels. The differential unit is comprised of a pair of single-pinion planetary gear units. In the differential unit, sun gears are rotated by a torque of the drive motor, ring gears are connected to each other in such a manner as to rotate in opposite directions, and the carriers are connected to drive wheels through driveshafts.

In a vehicle provided with the torque vectoring device taught by WO 2015/008661, torque split ratio to the right and left drive wheels may be altered by the torque vectoring device. In the vehicle of this kind, braking force applied to each of the drive wheels has to be controlled by conventional brake devices individually arranged to control each of the drive wheels. In order to ensure sufficient braking force, the brake device of this kind is provided with a rotary member such as a disc and a drum, a friction member contacted to the rotary member, and an actuator such as a hydraulic cylinder. However, a weight of the brake device of this kind is rather heavy and hence an unsprung load of the vehicle may be increased. In the vehicle thus using the conventional torque vectoring device, therefore, vibrations may be increased.

SUMMARY

Aspects of embodiments of the present application have been conceived noting the foregoing technical problems, and it is therefore an object of embodiments of the present application is to provide a drive unit having a downsized brake device for applying a braking force to a drive wheel.

The present application relates to a drive unit, comprising: a prime mover that propels a vehicle; a first driveshaft to which torque is transmitted from the prime mover and which is connected to one of right and left driving wheels; and a second drive shaft to which torque is transmitted from the prime mover and which is connected to other of the right and left driving wheels. The first drive shaft and the second drive shaft are allowed to be rotated by different torques, and the prime mover includes at least a first motor and a second motor. In order to achieve the above-explained objective, according to the embodiments of the present disclosure, the drive unit is provided with: a first speed reducing device that transmits torque of the first motor to the first drive shaft while amplifying; a second speed reducing device that transmits torque of the second motor to the second drive shaft while amplifying; a first torque transmitting route for transmitting torque from the first motor to the first drive shaft; a first rotary member that is situated closer to the first motor than the first speed reducing device in the first torque transmitting route; a first brake device that applies braking torque to the first rotary member; a second torque transmitting route for transmitting torque from the second motor to the second drive shaft; a second rotary member that is situated closer to the second motor than the second speed reducing device in the second torque transmitting route; and a second brake device that applies braking torque to the second rotary member.

In a non-limiting embodiment, the first drive shaft may include a first end that is connected to one of the drive wheels, and a second end of an opposite side to the first end. The first rotary member and the first drive shaft may be arranged in such a manner that a rotational center axis of the first rotary member and a rotational center axis of the second end of the first drive shaft are aligned parallel to each other. The second drive shaft may also include a third end that is connected to the other of the drive wheels, and a fourth end of an opposite side to the third end. Likewise, the second rotary member and the second drive shaft may also be arranged in such a manner that a rotational center axis of the second rotary member and a rotational center axis of the fourth end of the second drive shaft are aligned parallel to each other.

In a non-limiting embodiment, the first speed reducing device may include a first planetary gear unit comprising an input element that is connected to the first motor, a first output element that is connected to the first driveshaft, and a first reaction element that establishes a reaction to output an input torque to the first input element from the first output element. The second speed reducing device may also include a second planetary gear unit comprising an input element that is connected to the second motor, a second output element that is connected to the second driveshaft, and a second reaction element that establishes a reaction to output an input torque to the second input element from the second output element. The first driveshaft may include a fifth end that is connected to one of the drive wheels, and a sixth end of an opposite side to the fifth end that is connected to the first output element. The first rotary member and the first drive shaft may be arranged in such a manner that a rotational center axis of the first rotary member and a rotational center axis of the second end of the first drive shaft are aligned coaxially with each other. The second drive shaft may also include a seventh end that is connected to the other of the drive wheels, and an eighth end of an opposite side to the seventh end that is connected to the second output element. Likewise, the second rotary member and the second drive shaft may also be arranged in such a manner that a rotational center axis of the second rotary member and a rotational center axis of the eighth end of the second drive shaft are aligned coaxially with each other.

In a non-limiting embodiment, the first rotary member may include a first output shaft that protrudes from both sides of the first motor, and a first output gear may be fitted onto one end of the first output shaft. The first output gear may be connected to the first speed reducing device, and the first brake device may be arranged in such a manner as to apply a braking torque to the other end of the first output shaft. The second rotary member may also include a second output shaft that protrudes from both sides of the second motor, and a second output gear may be fitted onto one end of the second output shaft. Likewise, the second output gear may also be connected to the second speed reducing device, and the second brake device may be arranged in such a manner as to apply a braking torque to the other end of the second output shaft.

In a non-limiting embodiment, the drive unit may further comprise a braking torque maintaining device that maintains a braking torque established by any one of the first brake device and the second brake device.

In a non-limiting embodiment, the braking torque maintaining device may include an electromagnetic actuator that is unenergized to maintain the braking torque established by any one of the first brake device and the second brake device.

In a non-limiting embodiment, any one of the first brake device and the second brake device may include a brake rotor and a stopper member. Said one of the first brake device and the second brake device may be adapted to apply a braking torque to the brake rotor by bringing the stopper member into frictional contact to the brake rotor. In addition, the braking torque maintaining device may be adapted to maintain a frictional force acting between the stopper member and the brake rotor.

In a non-limiting embodiment, the first rotary member may be rotated integrally with a first brake rotor, and the first brake device may be adapted to apply a braking torque to the first brake rotor by bringing a first stopper member into frictional contact to the first brake rotor. Likewise, the second rotary member may also be rotated integrally with a second brake rotor, and the second brake device may be adapted to apply a braking torque to the second brake rotor by bringing a second stopper member into frictional contact to the second brake rotor. In addition, the electromagnetic actuator may include a braking motor that is rotated in one direction to bring any one of the first stopper member and the first brake rotor into contact to the other of the first stopper member and the first brake rotor, and to bring any one of the second stopper member and the second brake rotor into contact to the other of the second stopper member and the second brake rotor.

In a non-limiting embodiment, the first brake device may include a first actuator that establishes an electromagnetic force to control a breaking torque when energized, and the second brake device may include a second actuator that establishes an electromagnetic force to control a breaking torque when energized.

Thus, according to the embodiment of the present disclosure, the drive unit comprises the first torque transmitting route for transmitting torque from the first motor to the first drive shaft, the second torque transmitting route for transmitting torque from the second motor to the second drive shaft, and the brake devices that apply braking torques to the rotary members situated closer to the motors than the speed reducing devices. Specifically, the braking torque generated by the brake device is applied to the driveshaft through the speed reducing device while being amplified. According to the embodiment of the present disclosure, therefore, the brake device may be downsized. In addition, since the brake device is situated closer to the motors than the driveshaft, number of parts attached to a drive wheel may be reduced. For this reason, an unsprung load of the vehicle may be reduced to improve running stability of the vehicle.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
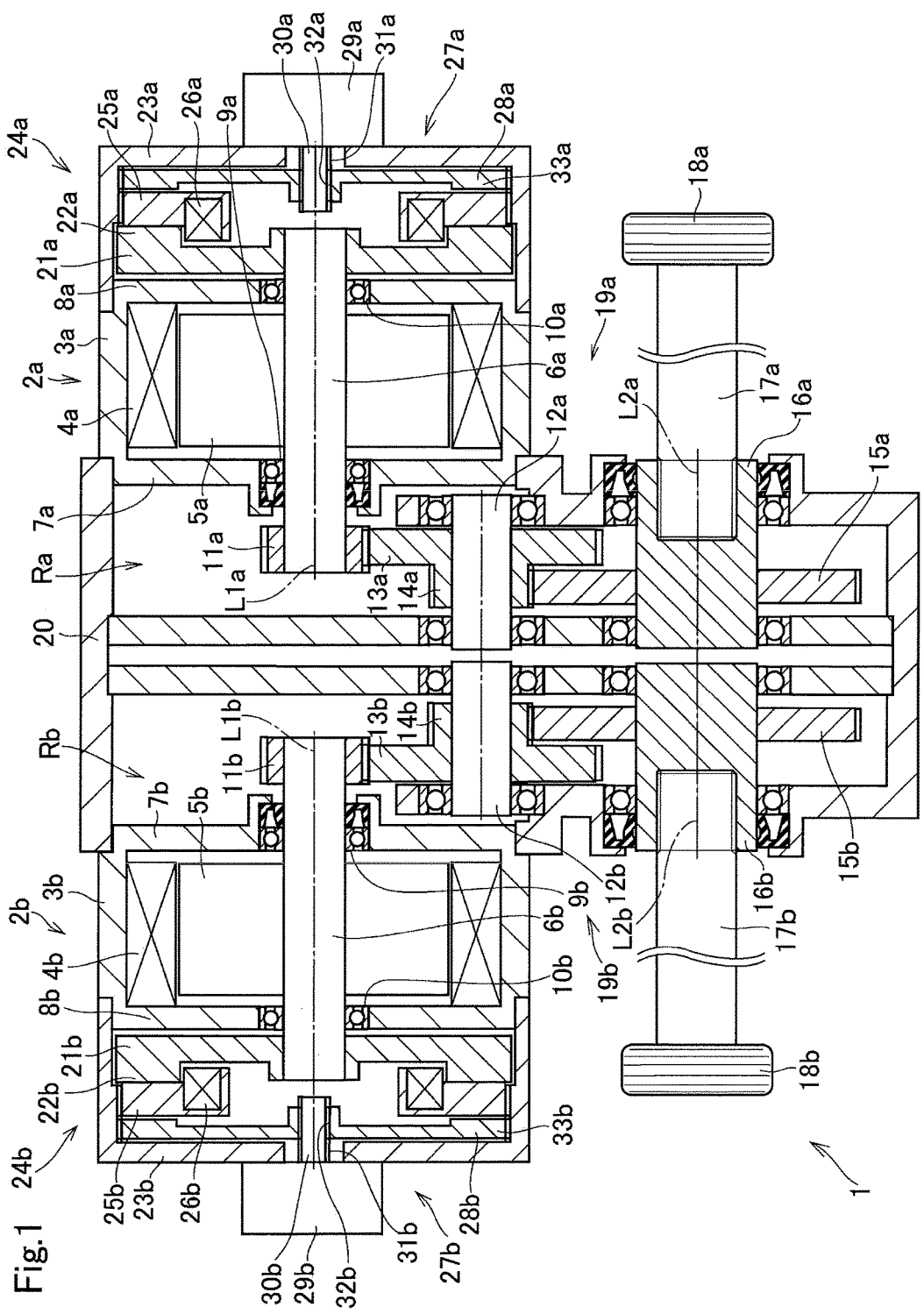
FIG. 1 is a cross-sectional view showing a structure of the drive unit according to a first embodiment of the present disclosure.

The preferred embodiments of the present application will now be explained with reference to the accompanying drawings. Turning now to FIG. 1, there is shown the first embodiment of the drive unit according to the present disclosure. As can be seen from FIG. 1, a structure of the drive unit 1 is substantially symmetrical across a width center of the vehicle. In FIG. 1, accordingly, the reference letter "a" designates members arranged in the right half of the drive unit 1, and the reference letters "b" designates members arranged in the left half of the drive unit 1. In the flowing explanation, the members in the right half of the drive unit 1 will be called the "first member", and the members in the left half of the drive unit 1 will be called the "second member" as necessary The drive unit 1 includes a motor 2 serving as a prime mover of a vehicle. For example, a permanent magnet synchronous motor may be used as the drive motor 2. The drive motor 2 comprises a cylindrical stator 4 fixed to an inner surface of a motor housing 3, and a cylindrical rotor 5 situated in an inner circumferential side of the stator 4. The rotor 5 is fitted onto an output shaft 6 to be rotated integrally therewith around a rotational center axis L1. Both ends of the output shaft 6 penetrate through sidewalls 7 and 8 while being supported by bearings 9 and 10 in a rotatable manner.

An output gear 11 is fitted onto a laterally inner end of the output shaft 6 of the width center side, and a countershaft 12 extends parallel to the output shaft 6. A counter driven gear 13 that is diametrically larger than the output gear 11 is fitted onto a laterally outer portion of the countershaft 12 while being meshed with the output gear 11, and a pinion gear 14 that is diametrically smaller than the counter driven gear 13 is also fitted onto a laterally inner portion of the countershaft 12 to be meshed with a final reduction gear 15 that is diametrically larger than the pinion gear 14.

A cylindrical shaft 16 is inserted into the final reduction gear 15 in such a manner as to protrude laterally outwardly while opening to laterally outside. Specifically, the cylindrical shaft 16 extends in such a manner that a rotational center axis L2 thereof extends in parallel with the rotational center axis L1 of the output shaft 6. A laterally inner end of a driveshaft 17 is splined into the opening of the cylindrical shaft 16, and a drive wheel 18 is attached to a laterally outer end of the driveshaft 17. As the conventional driveshaft, the driveshaft 17 is provided with a connecting device (not shown) such as a constant-velocity joint for adjusting a level of the rotational center.

Accordingly, torque of the output gear 11 is delivered to the driveshaft 17 while being multiplied in accordance with a gear ratio between the output gear 11 and the counter driven gear 13, and a gear ratio between the pinion gear 14 and the final reduction gear 15. That is, the output gear 11, the counter driven gear 13, the pinion gear 14 and the final reduction gear 15 serve as a speed reducing device 19 (speed reducing devices 19*a*, 19*b*). In addition, the output shaft 6, the output gear 11, the counter driven gear 13, the pinion gear 14, and the final reduction gear 15 form a torque transmitting route R(torque transmitting routes R*a*, R*b*).

The output gear 11, the counter driven gear 13, the pinion gear 14, the final reduction gear 15, the countershaft 12 and the cylindrical shaft 16 are held in a center housing 20. A right end of the center housing 20 is joined to the first motor housing 3*a*, and a left end of the center housing 20 is joined to the second motor housing 3*b*. That is, the countershaft 12 and the cylindrical shaft 16 are supported by the center housing 20 in a rotatable manner.

Specifically, in the center housing 20, the first output shaft 6*a* and the second output shaft 6*b* are held in such a manner that the rotational center axis L1*a* of the first output shaft 6*a* and the rotational center axis L1*b* of the second output shaft 6*b* are aligned coaxially with each other. Likewise, the rotational center axis L2*a* of the first cylindrical shaft 16*a* and the rotational center axis L2*b* of the second cylindrical shaft 16*b* are aligned coaxially with each other.

A disc-shaped brake rotor 21 (brake rotors 21*a*, 21*b*) made of magnetic material is fitted onto a laterally outer end of the output shaft 6. An outer diameter of the brake rotor 21 is slightly smaller than an inner diameter of the motor housing 3, and an annular protrusion 22 is formed on a face opposite to the motor 2.

A cylindrically-bottomed cover member 23 having an inner diameter larger than the outer diameter of the brake rotor 21 is joined to a laterally outer end of the motor housing 3. A brake device 24 is held in a space enclosed by the motor housing 3 and the cover member 23.

The brake device 24 comprises the brake rotor 21, and an annular pushing member 25 as a stopper member that is opposed to the annular protrusion 22 of the brake rotor 21. An outer circumferential face of the pushing member 25 is splined to an inner circumferential face of the cover member 23 so that the pushing member 25 is allowed to reciprocate in an axial direction of the cover member 23 but is not allowed to rotate. An inner circumferential portion of the pushing member 25 is situated in an inner circumferential side of the annular protrusion 22 while being protruded toward the brake rotor 21, and a coil 26 is wound around the protrusion of the pushing member 25.

When the coil 26 is energized, the coil 26 generates an electromagnetic force so that the pushing member 25 is brought into contact to the brake rotor 21 by the electromagnetic force. In this situation, since the pushing member 25 is not allowed to rotate, a frictional braking torque is applied to the brake rotor 21 according to a contact pressure between the pushing member 25 and the brake rotor 21. Consequently, the braking torque is applied to the output shaft 6 of the motor 2. The frictional force acting between the brake rotor 21 and the pushing member 25 is changed depending on a current value applied to the coil 26, that is, the braking torque applied to the brake rotor 21 can be controlled by controlling the current value applied to the coil 26. Accordingly, in the drive unit 1, the output shaft 6 serves as the rotary member, the coil 26*a* of the first pushing member 25*a* serves as the first actuator, and the coil 26*b* of the second pushing member 25*b* serves as the second actuator.

However, the braking torque applied to the output shaft 6 of the motor 2 cannot be maintained when the power is off to park the vehicle. In order to maintain a frictional contact between the brake rotor 21 and the pushing member 25 during parking, the drive unit 1 is provided with a parking lock device 27 as a braking torque maintaining device. Specifically, the parking lock device 27 comprises an annular plate member 28 opposed to the brake rotor 21 across the pushing member 25, and a parking motor 29 that reciprocates the plate member 28 in the axial direction.

The parking motor 29 is attached to an outer face a sidewall of the cover member 23, and an output shaft 30 of the parking motor 29 penetrates through the sidewall of the cover member 23 and the plate member 28. A male thread 31 is formed on an outer circumferential face of the output shaft 30 of the parking motor 29, and a female thread 32 is formed on an inner circumferential face of the plate member 28 to be mated with the male thread 31. An outer circumferential edge of the plate member 28 is also splined to the inner circumferential face of the cover member 23 so that the plate member 28 is allowed to reciprocate on the output shaft 30 by actuating the parking motor 29. Thus, the output shaft 30 and the plate member 28 serve as a feed screw mechanism. In addition, an annular protrusion 33 protruding toward the pushing member 25 is formed on an outer circumferential portion of the plate member 28 to be contacted to the pushing member 25.

In order to maintain the braking torque when the vehicle is powered off or when a shift lever is shifted to the parking position, the plate member 28 is brought into contact to the pushing member 25 to clamp the pushing member 25 between the plate member 28 and the brake rotor 21 by activating the parking motor 29, and then the current supply to the parking motor 29 is stopped. Consequently, the braking torque is maintained by the brake device 24.

Next, an action of the drive unit 1 will be explained hereinafter. The motor 2 also has a generating function, and is adapted to generate not only a driving torque but also a braking torque. Specifically, the first motor 2*a* is connected to the first driveshaft 17*a*, and the second motor 2*b* is connected to the second driveshaft 17*b*. That is, the first motor 2*a* and the second motor 2*b* are connected independently to the first driveshaft 17*a* and the second driveshaft 17*b*. In the drive unit 1, therefore, torques delivered to the first driveshaft 17*a* and the second driveshaft 17*b* can be differentiated from each other to rotate the first drive wheel 18*a* and the second drive wheel 18*b* relatively to each other, by adjusting output torques of the first motor 2*a* and the second motor 2*b* in accordance with required driving forces or braking forces (as will be simply called the "driving force" hereinafter) of the first drive wheel 18*a* and the second drive wheel 18*b*. Thus, the drive unit 1 is adapted to perform a differential action. Specifically, the driving forces of the first drive wheel 18*a* and the second drive wheel 18*b* may be equalized by equalizing the output torques of the first motor 2*a* and the second motor 2*b*. By contrast, the driving forces of the first drive wheel 18*a* and the second drive wheel 18*b* may also be differentiated by differentiating the output torques of the first motor 2*a* and the second motor 2*b* to stabilize vehicle behavior during turning.

When a required braking force is larger than the maximum braking torque of the motor 2 or when a state of charge of a battery (not shown) connected to the motor 2 is full, a shortage of the braking force is generated by the brake device 24 by supplying current to the coil 26 in accordance with the shortage of the braking torque. The torques generated by the first brake device 24a and the second brake device 24b may also be differentiated in accordance with the required braking force to be applied to the first drive wheel 18a and the second drive wheel 18b.

The driving torques or the braking torques generated by the motor 2 and the brake device 24 are delivered to the drive wheel 18 through the speed reducing device 19 while being amplified. For this reason, the maximum driving torque and the braking torque required for the motor 2 and the brake device 24 may be reduced, and hence the motor 2 and the brake device 24 may be downsized.

In addition, since the brake device 24 is situated in an input side (i.e., the prime mover side) of the driveshaft 17, number of parts attached to the drive wheel 18 may be reduced. In the drive unit 1, therefore, an unsprung load of the vehicle may be reduced to improve running stability of the vehicle.

Further, as described, the output shaft 6 of the motor 2 and the driveshaft 17 are arranged in such a manner that the rotational center axis L1 of the output shaft 6 and the rotational center axis L2 of the cylindrical shaft 16 are aligned parallel to each other. In the drive unit 1, therefore, the first final reduction gear 15a and the second final reduction gear 15b may be arranged close to each other, and the first cylindrical shaft 16a and the second cylindrical shaft 16b may be arranged close to each other. For this reason, each of the driveshaft 17 may be elongated so that an oscillation angle of the connecting device (not shown) of the driveshaft 17 may be reduced to reduce a power loss.

Figure 2:
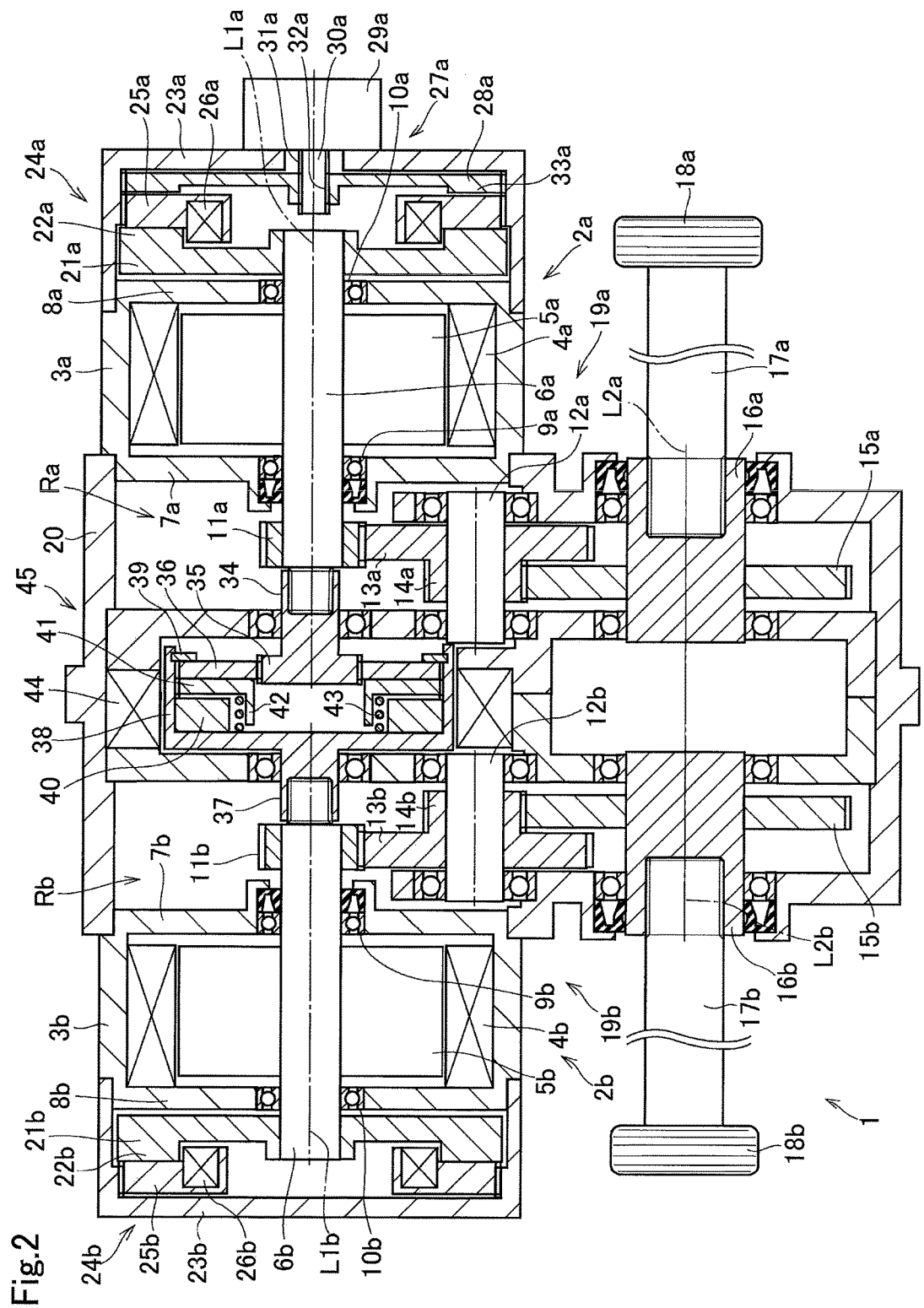
FIG. 2 is a cross-sectional view showing a structure of the drive unit according to a second embodiment of the present disclosure.

When the vehicle is travelling in a straight line or making a slight turn, it is preferable to equalize rotational speeds of the first drive wheel 18a and the second drive wheel 18b by equalizing the torques applied thereto. To this end, in the drive unit 1, the output torques of the first motor 2a and the second motor 2b have to be synchronized accurately. Turning to FIG. 2, there is shown the second embodiment of the drive unit 1 in which the first output shaft 6a of the first motor 2a and the second output shaft 6b of the second motor 2b are rotated integrally. In the following explanation, common reference numerals are allotted to the elements in common with those in the first embodiment shown in FIG. 1, and detailed explanation for those common elements will be omitted.

According to the second embodiment shown in FIG. 2, a leading end of the first output shaft 6a of the first motor 2a protrudes from the first output gear 11a toward the width center of the drive unit 1 to be connected to a connection shaft 34. Specifically, a hollow portion to which the leading end of the first output shaft 6a is inserted is formed on a leading end of the connection shaft 34, and a flange 35 is formed on a base end of the connection shaft 34. A spline is formed on an outer circumferential face of the flange 35 so that an annular connection plate 36 is splined onto the flange 35.

A leading end of the second output shaft 6b of the second motor 2b also protrudes from the second output gear 11b toward the width center of the drive unit 1 to be connected to an extension shaft 37. Specifically, a hollow portion is formed on a leading end of the extension shaft 37, and the leading end of the second output shaft 6b is inserted into the hollow portion. On the other hand, a bottomed-cylindrical holder portion 38 is formed on a base end of the extension shaft 37, and the connection plate 36 is held in the holder portion 38 while being allowed to rotate relatively therewith.

In order to prevent detachment of the connection plate 36 from the holder portion 38, a snap ring 39 is attached to an opening end of the holder portion 38.

In the holder portion 38, an annular positioning plate 40 is disposed adjacent to a bottom wall, and a pushing plate 41 is interposed between the positioning plate 40 and the connection plate 36. The pushing plate 41 is splined to the holder portion 38 so that the pushing plate 41 is allowed to rotate integrally with the holder portion 38 and to reciprocate in the axial direction within the holder portion 38. The pushing plate 41 is made of magnetic material, and a cylindrical portion 42 protrudes from an inner circumferential end of the pushing plate 41 toward the bottom wall of the holder portion 38. A coil spring 43 is fitted onto the cylindrical portion 42 while being compressed by the pushing plate 41 and the bottom wall of the holder portion 38. A coil 44 is wound around the holder portion 38.

When the coil 44 is energized, an electromagnetic force is applied to the pushing plate 41 to push the pushing plate 41 toward the bottom wall of the holder portion 38 against the elastic force of the coil spring 43. By contrast, when a current supply to the coil 44 is stopped, the pushing plate 41 is pushed by the coil spring 43 to be brought into frictional contact to the connection plate 36. The friction force to be established between the pushing plate 41 and the connection plate 36 is adjusted in such a manner that a relative rotation between the pushing plate 41 and the connection plate 36 will not be caused by a speed difference or a torque difference between the first output shaft 6a and the second output shaft 6b during propulsion in a straight line or making a slight turn. Specifically, a torque transmitting capacity between the pushing plate 41 and the connection plate 36 is governed by a current value applied to the coil 44, and a torque transmission between the pushing plate 41 and the connection plate 36 is interrupted by stopping a current supply to the coil 44. That is, the pushing plate 41 and the connection plate 36 serve as a friction clutch 45 using the coil 44 as an electromagnetic actuator.

Specifically, when the vehicle is travelling in a straight line or making a slight turn, the current supply to the coil 44 is stopped to bring the pushing plate 41 into frictional contact to the connection plate 36. Consequently, the first output shaft 6a and the second output shaft 6b are rotated integrally even if the output torques of the first motor 2a and the second motor 2b are different. For this reason, a relative rotation between the first drive wheel 18a and the second drive wheel 18b can be prevented during propulsion in a straight line or making a slight turn to improve running stability of the vehicle without requiring accurate control.

That is, when the vehicle is parked, the current supply to the coil 44 is stopped and hence the friction clutch 45 is brought into engagement. In this situation, both of the drive wheels 18a and 18b can be halted by stopping the rotation of any one of the first output shaft 6a and the second output shaft 6b. In the drive unit 1 according to the second embodiment, therefore, only the first parking motor 29a and the first plate member 28a are arranged in the first motor 2a side. In the drive unit 1 according to the second embodiment, torques and rotational speeds of the first drive wheel 18a and the second drive wheel 18b may be differentiated by controlling the first motor 2a and the second motor 2b while energizing the coil 44.

Figure 3:
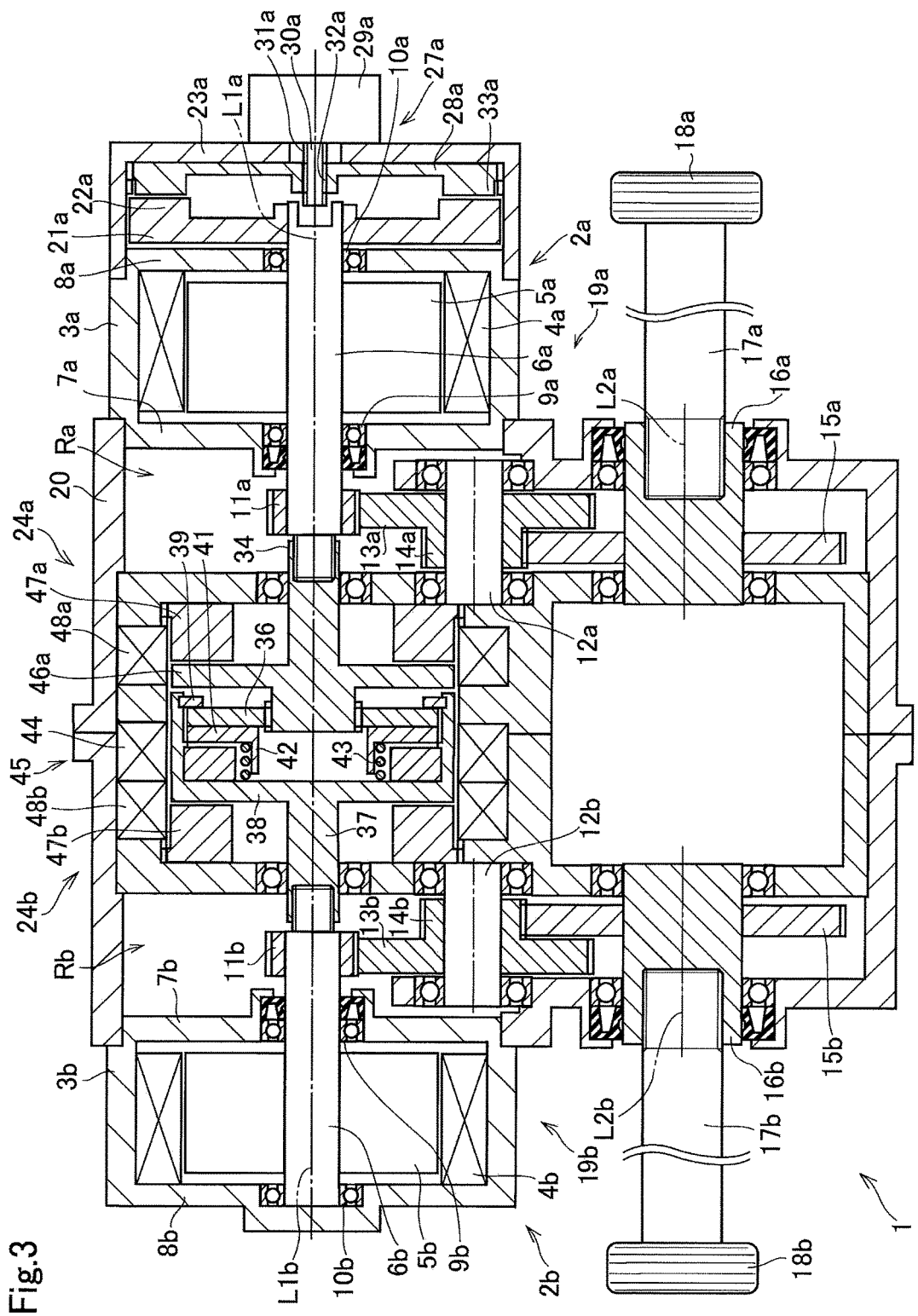
FIG. 3 is a cross-sectional view showing a structure of the drive unit according to a third embodiment of the present disclosure.

As shown in FIG. 3, according to the third embodiment of the present disclosure, the brake device 24 may also be arranged in the width center of the drive unit 1. In the following explanation, common reference numerals are allotted to the elements in common with those in the foregoing embodiments, and detailed explanation for those common elements will be omitted.

In the drive unit 1 shown in FIG. 3, a spline is formed on an outer circumferential face of the base end of the connection shaft 34, and the connection plate 36 is splined onto the base end of the connection shaft 34. In addition, a flange 46 serving as a brake rotor is formed on an intermediate portion of the connection shaft 34. Specifically, the flange 46 is formed on the connection shaft 34 at a portion between an opening end of the holder portion 38 and a leading end of the connection shaft 34, and an outer diameter of the flange 46 is substantially identical to that of the holder portion 38.

An outer circumferential face of a first brake disc 47*a* made of magnetic material is splined to an inner circumferential face of the center housing 20 while being opposed to the first brake disc 47*a*. That is, the first brake disc 47*a* is allowed to reciprocate in the axial direction but is not allowed to rotate. In order to apply an electromagnetic force to the first brake disc 47*a*, a first coil 48*a* is wound around the flange 46 and the first brake disc 47*a*. In the drive unit 1 shown in FIG. 3, accordingly, the first brake disc 47*a* is brought into frictional contact to the flange 46 by applying current to the first coil 48*a*. That is, a frictional force to be established between the first brake disc 47*a* and the flange 46 is governed by a current value applied to the first coil 48*a*. Optionally, a return spring or the like may be arranged in the drive unit shown in FIG. 3 to isolate the first brake disc 47*a* away from the flange 46.

An outer circumferential face of a second brake disc 47*b* made of magnetic material is also splined to the inner circumferential face of the center housing 20 while being opposed to the bottom wall of the holder portion 38 from the second motor 2*b* side. That is, the second brake disc 47*b* is allowed to reciprocate in the axial direction but is not allowed to rotate. In order to apply an electromagnetic force to the second brake disc 47*b*, a second coil 48*b* is wound around the second brake disc 47*b*. In the drive unit 1 shown in FIG. 3, accordingly, the second brake disc 47*b* is brought into frictional contact to the bottom wall of the holder portion 38 by applying current to the second coil 48*b*. That is, a braking torque is applied to the bottom wall of the holder portion 38 in accordance with the current applied to the second coil 48*b*. Optionally, a return spring or the like may also be arranged in the drive unit 1 shown in FIG. 3 to isolate the second brake disc 47*b* away from the bottom wall of the holder portion 38.

In the drive unit 1 shown in FIG. 3, accordingly, the plate member 28 is opposed directly to the brake rotor 21 to be contacted to stop the rotation of the first output shaft 6*a*.

According to the third embodiment, therefore, the first coil 48*a* and the second coil 48*b* as the actuators of the brake device 24 can be arranged on both sides of the coil 44 for controlling the friction clutch 45. For this reason, an electric circuit for supplying the current to the first coil 48*a*, the coil 44 and the second coil 48*b* may be simplified.

Figure 4:
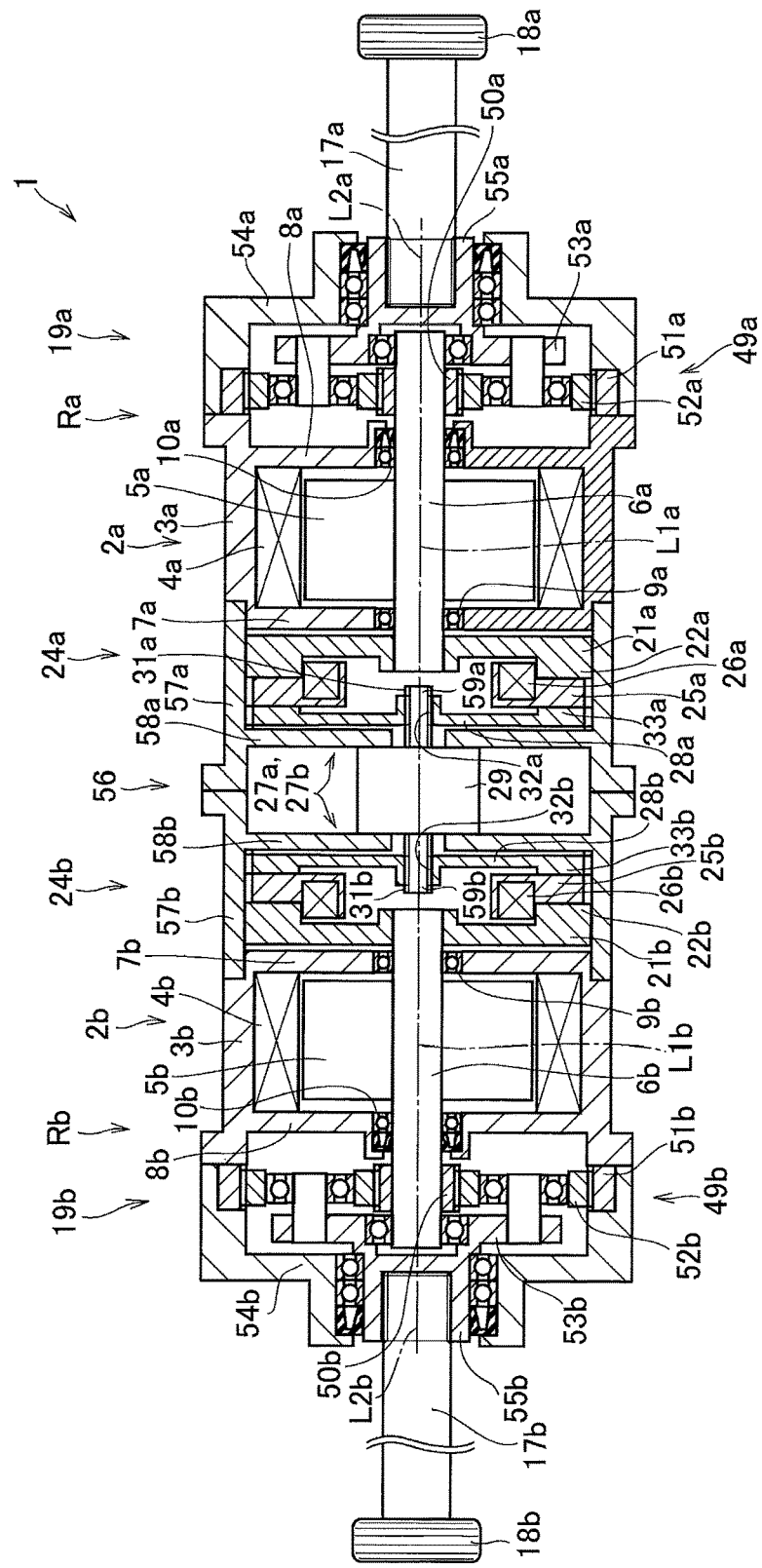
FIG. 4 is a cross-sectional view showing a structure of the drive unit according to a fourth embodiment of the present disclosure.

Turning to FIG. 4, there is shown the fourth embodiment of the drive unit 1 in which the output shafts 6*a* and 6*b* of the motors 2*a* and 2*b* and the driveshafts 17*a* and 17*b* are aligned coaxially. In the following explanation, common reference numerals are allotted to the elements in common with those in the foregoing embodiments, and detailed explanation for those common elements will be omitted. In the drive unit 1 shown in FIG. 4, a single pinion planetary gear unit 49 is connected to the laterally outer end of the output shaft 6 of the motor 2. Specifically, the planetary gear unit 49 comprises a sun gear 50, a ring gear 51 arranged concentrically with the sun gear 50, a plurality of pinion gears 52 interposed between the sun gear 50 and the ring gear 51, and a carrier 53 supporting the pinion gears 52 in such a manner as to allow the pinion gears 52 to revolve around the sun gear 50.

In the planetary gear unit 49, the sun gear 50 serves as an input element, the ring gear 51 serves as a reaction element, and the carrier 53 serves as an output element.

The planetary gear unit 49 is held in a bottomed-cylindrical cover member 54 (cover members 54*a*, 54*b*) in such a manner that the sun gear 50 is rotated integrally with the output shaft 6, and that the ring gear 51 is connected to an inner circumferential face of the cover member 54. The carrier 53 is connected to a cylindrical shaft 55, and the cylindrical shaft 55 protrudes laterally outwardly to penetrate through a bottom wall of the cover member 54 while being supported by the cover member 54 in a rotatable manner. In the planetary gear unit 49, the sun gear 50 is rotated at a higher speed than the carrier 53 so that the planetary gear unit 49 serves as the speed reducing device 19. The driveshaft 17 is inserted into the cylindrical shaft 55, and the cover member 54 is joined to laterally outer end of the motor housing 3.

The laterally inner end of the motor housing 3 is joined to a center housing 56. The center housing 56 is formed by combining inner end portions of a first cylindrical member 57*a* and a second cylindrical member 57*b*. A first disc portion 58*a* is formed in the first cylindrical member 57*a* at an intermediate portion, and a through hole is formed on a center of the first disc portion 58*a*. Likewise, a second disc portion 58*b* is formed in the second cylindrical member 57*b* at an intermediate portion, and a through hole is also formed on a center of the second disc portion 58*b*.

The above-explained brake rotor 21 is fitted onto the inner end portion of the output shaft 6 of the center housing 56 side. That is, the brake rotor 21, the pushing member 25 shown in FIG. 1 and the plate member 28 are held in a space between the disc portion 58 and the sidewall 7 of the motor housing 3. In the drive unit 1 shown in FIG. 4, the parking motor 29 is held in the center housing 56 between the first disc portion 58*a* and the second disc portion 58*b*.

The parking motor 29 comprises a first output shaft 59*a* protruding toward the first motor 2*a*, and a second output shaft 59*b* protruding toward the second motor 2*b*. A right-hand thread is formed on one of the first output shaft 59*a* and the second output shaft 59*b*, and a left-hand thread is formed on the other of the first output shaft 59*a* and the second output shaft 59*b*. The first plate member 28*a* is screwed onto the first output shaft 59*a*, and the second plate member 28*b* is screwed onto the second output shaft 59*b*. In the drive unit 1 shown in FIG. 4, the first plate member 28*a* and the second plate member 28*b* are isolated away from each other by rotating the parking motor 29 in a predetermined direction, and moved closer to each other by rotating the parking motor 29 in the opposite direction. Accordingly, in the drive unit 1 shown in FIG. 4, the parking motor 29 serves as a braking motor.

According to the fourth embodiment, a braking torque is applied to the output shaft 6 by bringing the pushing member 25 into contact to the brake rotor 21, and the braking torque is further applied to the driveshaft 17 and the drive wheel 18 through the planetary gear unit 49 while being amplified. According to the fourth embodiment, therefore, the brake rotor 21 and the pushing member 25 may be downsized. In addition, since the rotational center axes L1*a* and the L1*b* of the output shafts 6*a* and 6*b* are aligned coaxially with the rotational center axes L2*a* and the L2*b* of the driveshafts 17*a* and 17*b*, a height of the drive unit 1 may be shortened.

Further, since both of the first plate member 28a and the second plate member 28b are actuated by only one parking motor 29, the drive unit 1 may be downsized.

Figure 5:
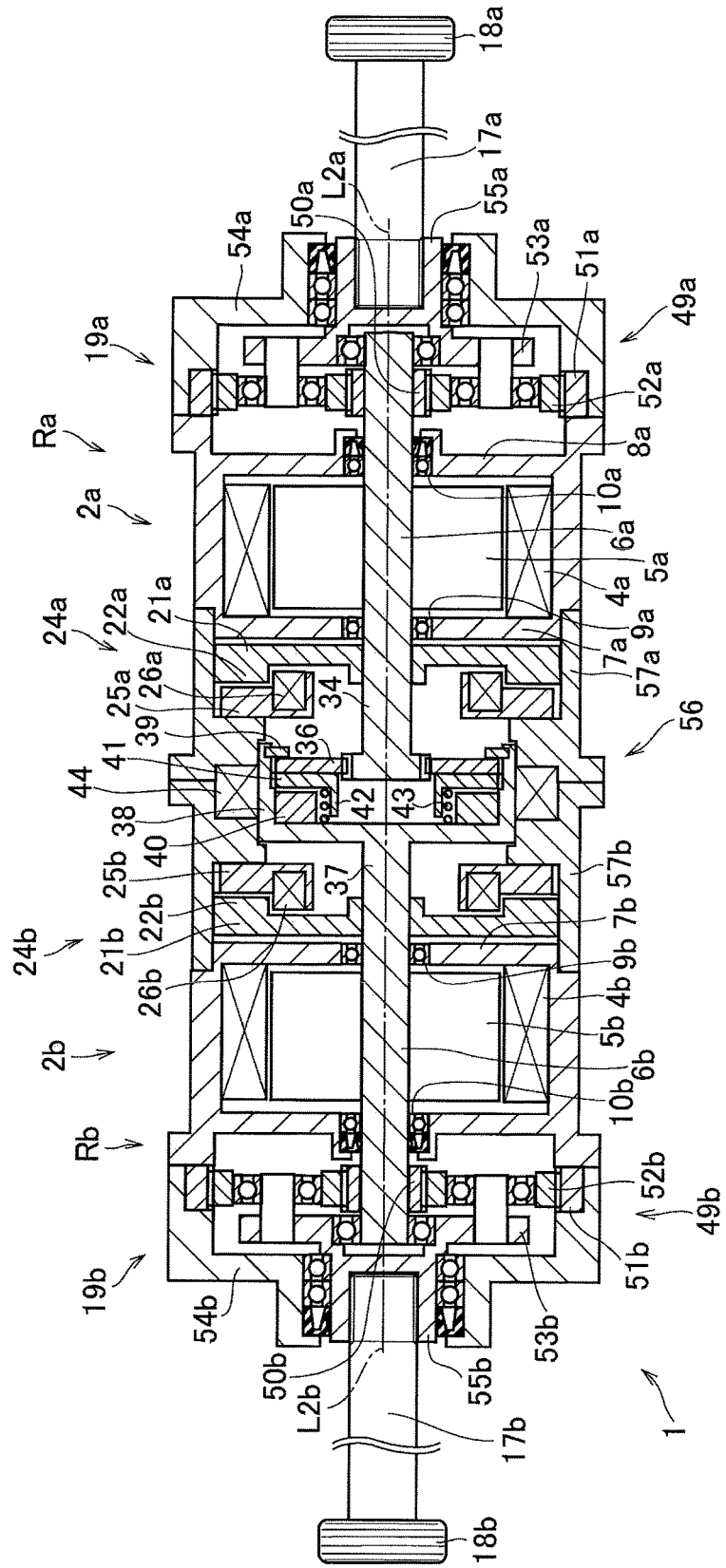
FIG. 5 is a cross-sectional view showing a cross-section of the drive unit according to a fourth embodiment in which a frictional clutch is arranged to integrate driveshafts.

Turning to FIG. 5, there is shown the fifth embodiment of the drive unit 1. According to the fifth embodiment, the holder portion 38, the connection plate 36, the pushing plate 41, the cylindrical portion 42, the coil spring 43 and the coil 44 are arranged at the center of the drive unit 1 instead of the parking motor 29. In the drive unit 1 shown in FIG. 5, the braking torque may be maintained during parking by halting any of the rotary members by a not shown pin or the like.

Although the above exemplary embodiment of the present application has been described, it will be understood by those skilled in the art that the drive unit according to the present application should not be limited to the described exemplary embodiment, and various changes and modifications can be made within the spirit and scope of the present disclosure. For example, the brake device 24 and the parking lock device 27 may also be actuated by a hydraulic actuator(s) to maintain the braking torque during parking. In addition, in the brake device 24, the pushing member 25 may also be brought into contact to the brake rotor 21 by a spring, and isolated away from the brake rotor 21 by a load established by an actuator. Further, the parking lock device 27 may also be configured to mechanically stop the rotation of any of the rotary members by engaging a parking gear with a parking lock arm.

What is claimed is:

1. A drive unit, comprising:
   a prime mover that propels a vehicle;
   a first driveshaft to which torque is transmitted from the prime mover and which is connected to one of right and left driving wheels; and
   a second drive shaft to which torque is transmitted from the prime mover and which is connected to other of the right and left driving wheels,
   wherein the first drive shaft and the second drive shaft are allowed to be rotated by different torques,
   the prime mover includes at least a first motor and a second motor;
   the drive unit comprising:
      a first speed reducing device that transmits torque of the first motor to the first drive shaft while amplifying;
      a second speed reducing device that transmits torque of the second motor to the second drive shaft while amplifying;
      a first torque transmitting route for transmitting torque from the first motor to the first drive shaft;
      a first rotary member that is situated closer to the first motor than the first speed reducing device in the first torque transmitting route;
      a first brake device that applies braking torque to the first rotary member;
      a second torque transmitting route for transmitting torque from the second motor to the second drive shaft;
      a second rotary member that is situated closer to the second motor than the second speed reducing device in the second torque transmitting route;
      a second brake device that applies braking torque to the second rotary member; and
      a braking torque maintaining device that maintains a braking torque established by any one of the first brake device and the second brake device,
   the braking torque maintaining device includes an electromagnetic actuator that is unenergized to maintain the braking torque established by any one of the first brake device and the second brake device,
   the first rotary member is rotated integrally with a first brake rotor,
   the first brake device is adapted to apply a braking torque to the first brake rotor by bringing a first stopper member into frictional contact to the first brake rotor,
   the second rotary member is rotated integrally with a second brake rotor,
   the second brake device is adapted to apply a braking torque to the second brake rotor by bringing a second stopper member into frictional contact to the second brake rotor, and
   the electromagnetic actuator includes a braking motor that is rotated in one direction to bring any one of the first stopper member and the first brake rotor into contact to the other of the first stopper member and the first brake rotor, and to bring any one of the second stopper member and the second brake rotor into contact to the other of the second stopper member and the second brake rotor.

2. The drive unit as claimed in claim 1,
   wherein the first drive shaft includes a first end that is connected to one of the drive wheels, and a second end of an opposite side to the first end,
   the first rotary member and the first drive shaft are arranged in such a manner that a rotational center axis of the first rotary member and a rotational center axis of the second end of the first drive shaft are aligned parallel to each other,
   the second drive shaft includes a third end that is connected to the other of the drive wheels, and a fourth end of an opposite side to the third end, and
   the second rotary member and the second drive shaft are arranged in such a manner that a rotational center axis of the second rotary member and a rotational center axis of the fourth end of the second drive shaft are aligned parallel to each other.

3. The drive unit as claimed in claim 1,
   wherein the first rotary member includes a first output shaft that protrudes from both sides of the first motor,
   a first output gear is fitted onto one end of the first output shaft,
   the first output gear is connected to the first speed reducing device, and the first brake device is arranged in such a manner as to apply a braking torque to the other end of the first output shaft,
   the second rotary member includes a second output shaft that protrudes from both sides of the second motor,
   a second output gear is fitted onto one end of the second output shaft, and the second output gear is connected to the second speed reducing device, and
   the second brake device is arranged in such a manner as to apply a braking torque to the other end of the second output shaft.

4. The drive unit as claimed in claim 1, wherein
   the first brake device includes a first actuator that establishes an electromagnetic force to control a breaking torque when energized, and
   the second brake device includes a second actuator that establishes an electromagnetic force to control a breaking torque when energized.

5. A drive unit, comprising:
   a prime mover that propels a vehicle;
   a first driveshaft to which torque is transmitted from the prime mover and which is connected to one of right and left driving wheels; and a second drive shaft to which torque is transmitted from the prime mover and which is connected to other of the right and left driving wheels,
wherein the first drive shaft and the second drive shaft are allowed to be rotated by different torques,
the prime mover includes at least a first motor and a second motor;
the drive unit comprising:
  a first speed reducing device that transmits torque of the first motor to the first drive shaft while amplifying;
  a second speed reducing device that transmits torque of the second motor to the second drive shaft while amplifying;
  a first torque transmitting route for transmitting torque from the first motor to the first drive shaft;
  a first rotary member that is situated closer to the first motor than the first speed reducing device in the first torque transmitting route;
  a first brake device that applies braking torque to the first rotary member;
  a second torque transmitting route for transmitting torque from the second motor to the second drive shaft;
  a second rotary member that is situated closer to the second motor than the second speed reducing device in the second torque transmitting route; and
  a second brake device that applies braking torque to the second rotary member,
the first speed reducing device includes a first planetary gear unit comprising an input element that is connected to the first motor, a first output element that is connected to the first driveshaft, and a first reaction element that establishes a reaction to output an input torque to the first input element from the first output element,
the second speed reducing device includes a second planetary gear unit comprising an input element that is connected to the second motor, a second output element that is connected to the second driveshaft, and a second reaction element that establishes a reaction to output an input torque to the second input element from the second output element,
the first driveshaft includes a fifth end that is connected to one of the drive wheels, and a sixth end of an opposite side to the fifth end that is connected to the first output element,
the first rotary member and the first drive shaft are arranged in such a manner that a rotational center axis of the first rotary member and a rotational center axis of the second end of the first drive shaft are aligned coaxially with each other,
the second drive shaft includes a seventh end that is connected to the other of the drive wheels, and an eighth end of an opposite side to the seventh end that is connected to the second output element, and
the second rotary member and the second drive shaft are arranged in such a manner that a rotational center axis of the second rotary member and a rotational center axis of the eighth end of the second drive shaft are aligned coaxially with each other.

* * * * *